Sept. 8, 1964    J. R. OISHEI ETAL    3,147,504
WINDSHIELD CLEANING SYSTEM

Filed Dec. 4, 1962    4 Sheets-Sheet 1

INVENTOR.
JOHN R. OISHEI and
MARTIN BITZER.
BY E. Herbert Liss
ATTORNEY.

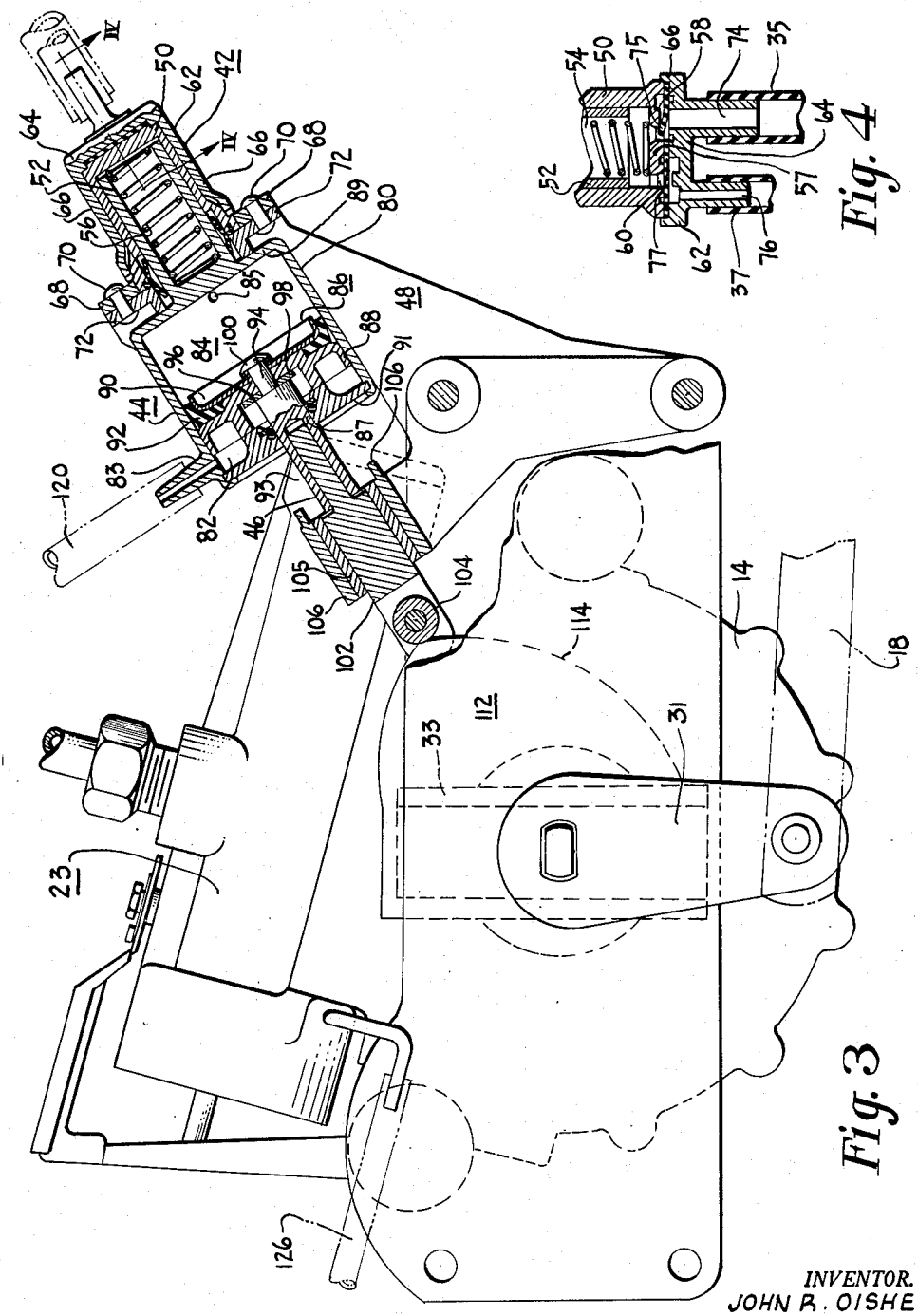

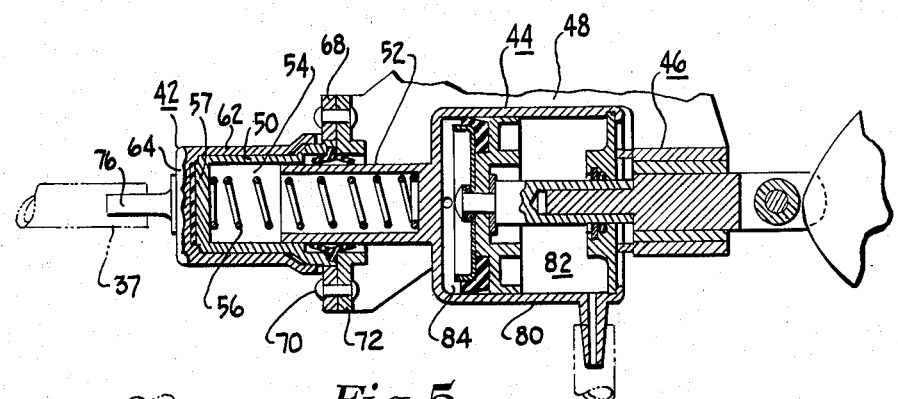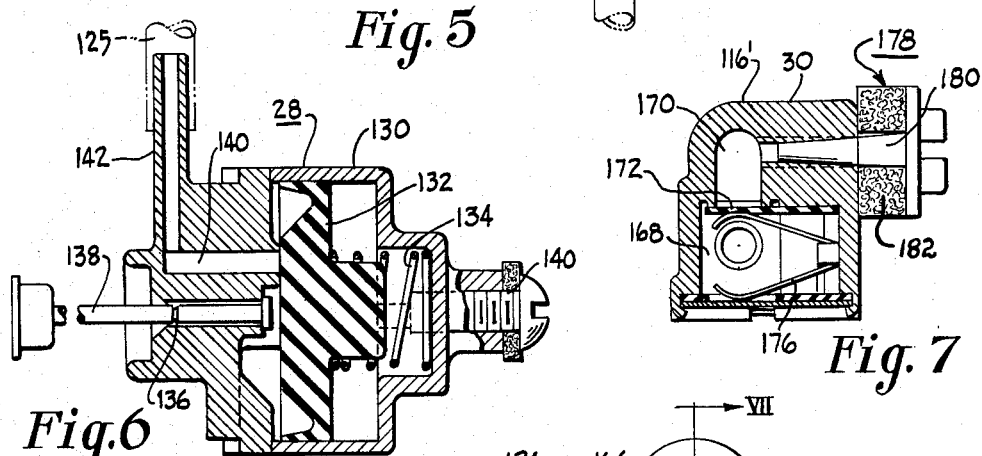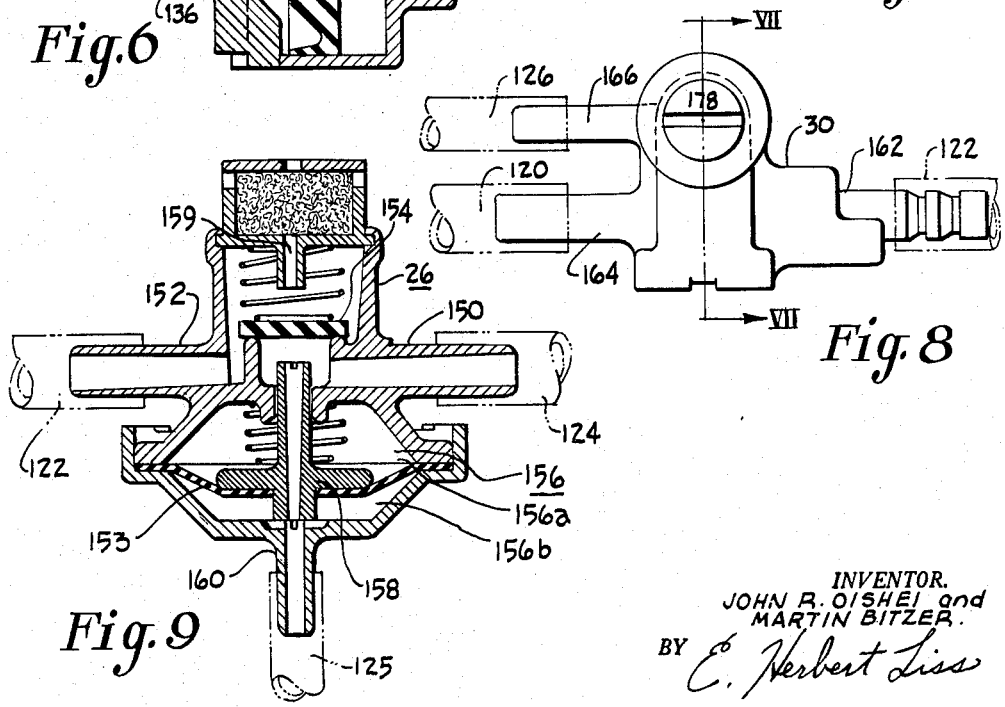

Sept. 8, 1964  J. R. OISHEI ETAL  3,147,504
WINDSHIELD CLEANING SYSTEM
Filed Dec. 4, 1962  4 Sheets-Sheet 4
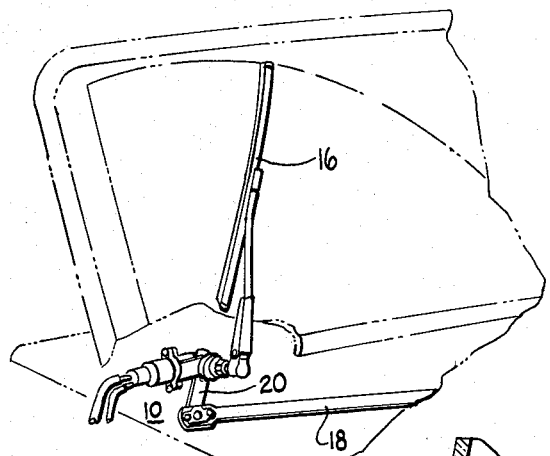
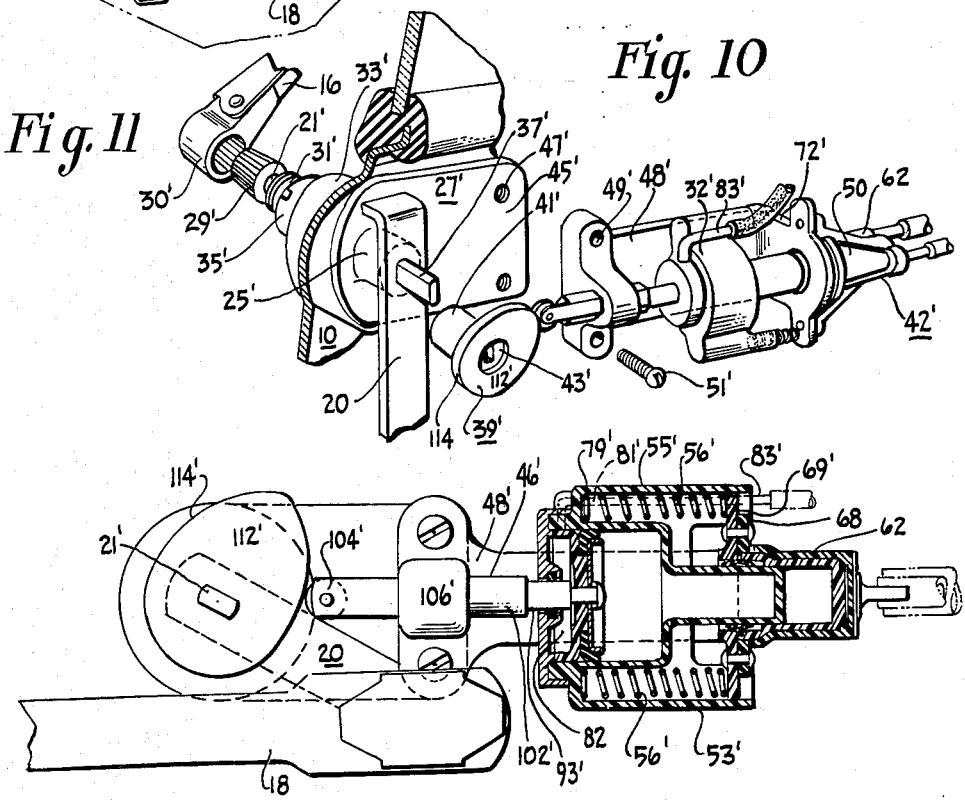
INVENTOR.
JOHN R. OISHEI and
BY  MARTIN BITZER
ATTORNEY.

United States Patent Office 3,147,504
Patented Sept. 8, 1964

3,147,504
WINDSHIELD CLEANING SYSTEM
John R. Oishei, Buffalo, and Martin Bitzer, Kenmore, N.Y., assignors to Trico Products Corporation, Buffalo, N.Y.
Filed Dec. 4, 1962, Ser. No. 242,167
6 Claims. (Cl. 15—250.02)

The present invention relates to apparatus for cleaning a windshield and more particularly to windshield cleaning apparatus utilizing a wiper transmission powered fluid pump coupled to an auxiliary drive.

Heretofore, it has been known to utilize wiper-washer coordinated systems for coordinating the spray of a washer with the stroke of a wiper. These systems comprised a plurality of complex components to obtain the desired results. To effect a spray of solvent on the windshield at the proper instant so as to avoid dripping and wasting of solvent, additional components are required in the prior art devices. It has also been known to power a washer pump by utilizing the output of the wiper motor coupled to a pump plunger. However, certain problems arise in such a system; for example, the pump plunger remains in operative engagement with the wiper motor, resulting in excessive wear on both the wiper motor and the pump mechanism. Furthermore, in case of freezing of the solvent or other obstructions in the solvent line, initiation of pumping action could result in severe damage to the system.

It is desirable in a system of this kind to employ as few components as possible to eliminate possible sources of wear and failure while at the same time to achieve rapid response and effective results.

The windshield cleaning system and pump of this invention utilizes a minimum number of components which are subjected to a minimum amount of wear. It is fail safe against damage due to solvent freezing or other obstructions in the lines. This system positively and unalterably coordinates wiper blade position with fluid delivery to obtain fluid delivery on the windshield at the optimum blade position thereby eliminating fluid waste.

In the coordinated system illustrated, washer-wiper action is synchronized to maintain fluid delivery for a prescribed duration and terminates prior to wiper action to provide a wet wiping and a subsequent dry wipe for drying the glass.

The principal object of the present invention is to provide an improved windshield cleaning system utilizing a washer pump coupled to the transmission linkage of a wiper motor.

Another object of the present invention is to provide an improved windshield cleaning system utilizing a washer pump which is in operative engagement with an auxiliary drive on the transmission linkage driven by the wiper motor only when the pump is in operation.

A further object of the present invention is to provide an improved windshield cleaning system which utilizes a washer pump which precludes damage to the system when obstructions in the washer lines are present or freezing of the solvent occurs.

A still further and more specific object of the invention is to provide an improved windshield cleaning system which utilizes a pump operated by the transmission linkage driven by a wiper motor which is coupled into operative engagement with the transmission linkage by a fluid operated control system which coordinates washer and wiper action to simultaneously initiate washer and wiper action and thereafter to sequentially uncouple the pump from the wiper motor drive and to interrupt operation of the wiper motor.

Other objects and advantages of the invention will be apparent from the following detailed description taken in connection with the accompanying drawings in which:

FIG. 3 is a cross sectional view of the washer pump connected to the wiper motor;

FIG. 4 is a fragmentary cross sectional view of the pump taken on line IV—IV of FIG. 3;

FIG. 5 is a cross sectional view of the washer pump similar to FIG. 3, showing the pump in uncoupled condition;

FIG. 6 is a cross sectional view of a dashpot control;

FIG. 7 is a cross sectional view taken on line VI—VI of FIG. 8, looking in the direction of the arrows, of a timer valve;

FIG. 8 is a side elevational view of the timer valve shown in FIG. 7;

FIG. 9 is a longitudinal view of a remotely controlled valve;

FIG. 10 is a fragmentary perspective view similar to FIG. 2 showing a modified embodiment of the invention;

FIG. 11 is an enlarged fragmentary perspective view, partly exploded, of the pump and drive assembly of the FIG. 10 modification; and FIG. 12 is an elevational view of the embodiment of the drive and pump shown in FIG. 10 with the pump shown in longitudinal cross section.

Briefly, the windshield cleaning system embodying this invention comprises a manually actuated dashpot control valve which when actuated opens a remotely controlled valve to permit vacuum from the manifold or other suitable vacuum source to pass therethrough to a timer control. The timer control has two outlets, one of which connects the vacuum source to a wiper motor coupler for initiating operation of the wiper motor. The other outlet connects the manifold vacuum to the washer pump.

The washer pump comprises a coupling assembly having a fluid displacing member rigidly secured to a coupling housing and slidably received for pumping action in a solvent cylinder which has an inlet port communicating through a check valve and conduit with a solvent reservoir and an outlet port communicating through a check valve and conduits to a pair of nozzles which direct a spray of solvent to a windshield. The fluid displacing member is spring biased outwardly from the cylinder. The coupling assembly includes the coupling housing rigidly secured to the fluid displacing member for movement therewith. The coupling assembly includes a piston axially slidable therein dividing the housing into chambers on each side of the piston. A plunger rod assembly is rigidly secured to the piston and projects outwardly through a central opening in the housing from the end of the housing remote from the fluid displacing member. The plunger rod carries a cam follower at its free end for engagement with a cam mounted on the wiper transmission and driven by the wiper motor. When it is desired to operate the washer pump, fluid pressure is introduced into the coupling housing to effect a pressure differential across the piston. This pressure differential drives and retains the piston toward the outward end of the housing remote from the fluid displacing member, extending the plunger rod assembly and causing the plunger rod follower to engage the cam. Rotation of the cam results in reciprocation of the entire plunger assembly, thereby alternately drawing fluid to the fluid cylinder from a reservoir and spraying it to the windshield through a check valve assembly having inlet and outlet ports connected to the solvent reservoir and spray nozzles, respectively. Equalization of the pressure in the chambers returns the coupling assembly to a condition where the plunger rod is axially movable relative to the fluid displacing member.

Figure 2:
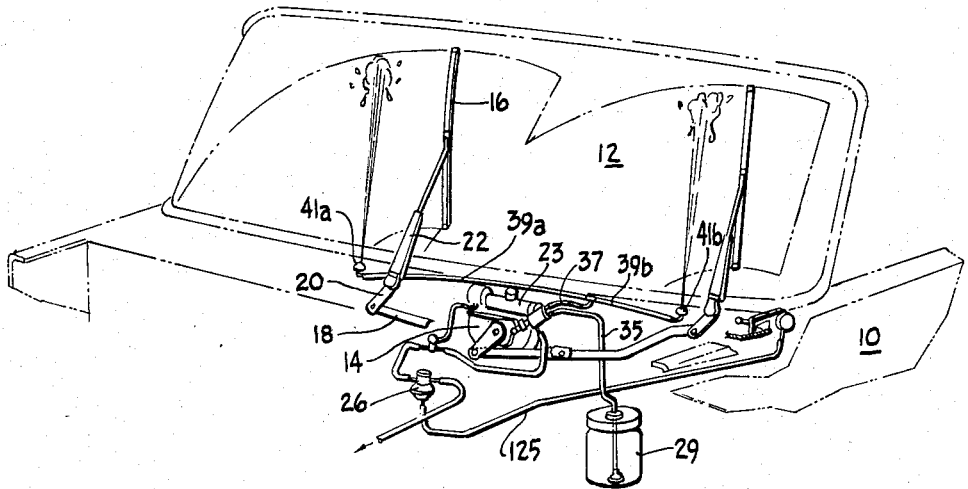
FIG. 2 is a fragmentary view of an automotive vehicle utilizing the windshield cleaning system of this invention.

Referring now to the drawings, there is shown in FIG. 2 a portion of an automotive vehicle 10 having a windshield 12 thereon. The vehicle is provided with a windshield wiper motor 14 for driving wiper blades 16 through driver 31 engaging auxiliary driver 33 which in turn drives links 18 and levers 20 which are rigidly secured to rockshafts (not shown) which mount wiper arms 22. A pump 32 is provided for drawing solvent from a reservoir 29 through conduits 35 and discharging through conduits 37, 39a and 39b to nozzles 41a and 41b, each of which direct a spray of solvent to the windshield 12. The wiper motor shown by way of example is one designed for operation by hydraulic pressure. It will, of course, be understood that any suitable wiper motor may be employed, such as a vacuum or electric operated motor. In the embodiment shown, one means of initiating motor operation is by a valve mechanism or motor coupler 23 which may be actuated either manually or by fluid pressure.

Figure 1:
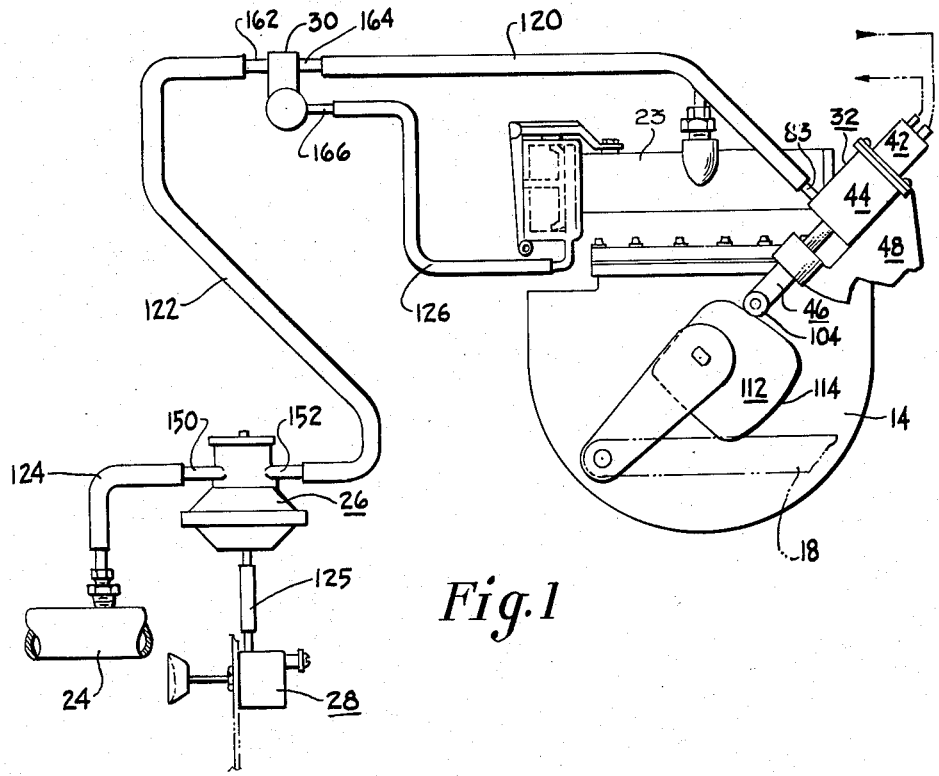
FIG. 1 is a schematic diagram of a windshield cleaning system incorporating the present invention.

A coordinated system embodying this invention is shown most clearly in FIG. 1. The illustrated system comprises a suitable source of vacuum as, for example, an intake manifold 24 of an automotive vehicle engine fragmentarily shown in FIG. 1, a remotely controlled valve 26, a manually actuated time delay mechanism 28 for operating the remotely controlled valve 26, a timer control 30 and a washer solvent pump 32. In accordance with the broader aspects of the invention, the solvent pump 32 may be suitably mounted adjacent any moving part of a wiper motor transmission linkage system and other and different control systems may be employed utilizing other and different components. It is here shown as being mounted adjacent the auxiliary driver 33 of the transmission linkage.

The unique pump of this invention is of relatively simple construction and includes a minimum number of parts. Essentially it comprises a pumping assembly 42, a pneumatic coupler 44 and a plunger rod assembly 46 secured on a mounting bracket 48. The pumping assembly 42 includes a cylinder 50 of any suitable material, as for example molded plastic, open at one end to receive a fluid displacing member 52 of suitable material and of a size and shape for complementary mating relationship with inner wall of cylinder 50. The fluid dispensing member 52 is telescopically received in the cylinder 50 and adapted to reciprocate therein to form an expansible chamber 54 having a compression spring 56 disposed therein tending to bias the fluid displacing member outwardly to enlarge the chamber 54. The closed end wall 57 of the cylinder 50 has an inlet port 58 for admitting solvent from reservoir 29 to chamber 54 and an outlet port 60 for ejecting solvent through nozzles 41a and 41b.

Cylinder 50 is retained in position on mounting bracket 48 by a U-shaped bracket 62. The base 64 of the U-shaped bracket 62 is complementary in size and shape with the end wall 57 of cylinder 50 and includes a depending annular flange which receives the cylinder 50. Each of the legs 66 of bracket 62 has an outwardly extending ear 68 at its free end for receiving a rivet 70 which secures it to flange 72 of bracket 48 thereby retaining the cylinder assembly in position on mounting bracket 48. The base 64 of the U-shaped bracket has a pair of nipples extending outwardly therefrom including an inlet nipple 74 and an outlet nipple 76 in communication with inlet port 58 and outlet port 60, respectively. Check valves 75 and 77 are disposed intermediate the base 64 of the bracket 62 and the end wall 57 of the cylinder 50 to control flow through the inlet and outlet ports, respectively, in a well known manner.

The pneumatic coupler of the pump 32 comprises a coupler housing 80 divided into a chamber 82 and a chamber 84 by a piston assembly 86. The piston assembly 86 includes a piston 88, a piston retaining cup 90, and an annular piston packing ring 92 disposed intermediate the piston 88 and the piston retaining cup 90. The piston packing ring 92 may be of any suitable material as, for example, molded rubber and engages the inner surface of the side walls of the coupler housing 80 in sealing engagement. The piston is axially movable within the coupler housing.

The chamber 82 has a nipple 83 extending therefrom for connection to a source of fluid pressure and the chamber 84 has a port 85 for venting to the atmosphere. The fluid displacing member 52 of pumping assembly 42 is disposed centrally and projects outwardly of end wall 89 of the coupler housing 80 and is shown formed integrally therewith. It may be rigidly secured thereto in any other suitable or desirable manner as, for example, by welding. A central opening 87 is provided in the end wall 91 of the coupler housing 80 for slidably receiving plunger assembly 46.

The plunger assembly 46 comprises a shaft 93 having reduced end portion 94 forming a shoulder 96. The reduced end portion 94 is received in tight fitting engagement in a central opening in piston assembly 86. The reduced portion 94 projects through the central opening. a sealing washer 98 is disposed between shoulder 96 and the adjacent surface of piston 88. The end of reduced end portion 94 which projects through the center in piston assembly 86 may be deformed as at 100 to retain the sealing washer 98, the piston 88, the piston packing ring 92 and the piston retaining cup in rigid assembled relationship on plunger assembly 46 clamped between shoulder 96 and the deformed end 100 of reduced end portion 94.

At its end remote from the piston assembly 86, the shaft 93 includes an enlarged portion 102 which carries a cam follower 104, illustrated in the drawings as a roller. Any suitable type of cam follower may be employed. The enlarged portion 102 of the shaft 93 is adapted to be received in a bearing mounted on bearing bracket 106 which is formed integral with or is rigidly secured to mounting bracket 48. The bearing 105 is constructed to permit axial movement of shaft 93, but to restrain it against rotation therein. This may be accomplished by making the enlarged portion 102 of shaft 93 and the bearing 105 of complementary mating polygonal shape or by other suitable means.

The pneumatic coupler 44 is utilized to extend the plunger rod assembly 46 outwardly of the coupler housing 80 into operative position and to effect a rigid coupling between the plunger rod assembly 46 and the fluid displacing member 52. To accomplish this, a pressure differential is maintained between chambers 82 and 84. One method of obtaining this pressure differential is by the introduction of sub atmospheric pressure to the chamber 82 through the nipple 83 and by the introduction of atmospheric pressure to the chamber 84 through the port 85. It will be understood, of course, that in accordance with the broader aspects of the invention, other suitable means may be employed to maintain a pressure differential across piston assembly 86 between chambers 82 and 84 as, for example, introduction of positive fluid pressure to chamber 84.

The pump operates in the following manner. When nipple 83 of coupler housing 80 is connected to a suitable vacuum source, the piston assembly 86, together with the plunger rod assembly 46, is drawn toward the end of the housing 80 remote from the fluid displacing member 52 and is rigidly retained in that position, as seen in FIG. 3, thereby extending the projecting end 88 of the shaft 93 outward and retaining it in that position. Thus, in effect, the coupler housing 80, the fluid displacing member 52, and the plunger rod assembly 46 becomes a rigid assembly. Now if a force is applied to the plunger rod 93, the entire plunger assembly 46 and fluid displacing member 52 moves as a unit, driving the fluid displacing member to the right, as seen in FIG. 3, into the solvent cylinder 50 to collapse solvent chamber 54 and thereby dispense through nipple 76 any solvent that may be in the chamber 54. When pressure is relieved on the plunger rod 93, the spring 56 will drive the fluid displacing member to the left, as seen in FIG. 3, thus extending chamber 54 and drawing solvent from a reservoir into the chamber through nipple 74. If the source of vacuum connected to nipple 83 of housing 80 is interrupted and vented, the piston assembly 86, together with the plunger rod assembly 46 and coupler housing 80 will assume the position shown in FIG. 5 and the plunger rod assembly 46 will be axially movable relative to the housing 80 and fluid displacing member 52. Stops are provided at suitable places on mounting bracket 48 to limit movement of the coupler housing 80, as for example, stops 106. Thus no pumping action can occur by virtue of force applied to the plunger rod 93. It is further true that should solvent in the solvent chamber 54 or in the conduits leading therefrom freeze and solidify, force applied to the plunger rod 93 would be sufficient to overcome the differential pressure between chambers 82 and 84 to thereby cause the plunger rod and piston to move to the position shown in FIG. 5 before any damage could be done to the pump or conduits in the system.

The pump 32 in its assembled position on the bracket 48 is shown mounted adjacent the wiper motor. It will, of course, be understood that in accordance with the broader aspects of the invention, this pump may be mounted adjacent any movable part of the wiper transmission linkage. A cam 112 is secured to the auxiliary driver 33 on the wiper transmission linkage and is movable therewith. The bracket 48 is mounted in such a position as to permit the roller or cam follower 104 to engage the cam surface 114 through the entire rotation of the auxiliary drive 33 when the pneumatic coupler 44 is in its operative state with the plunger rod assembly 46 extended, as seen in FIG. 3. The axial movement of the coupler housing 80 in a direction toward the cam is limited by engagement with the stops 106 or by other suitable stop means on the bracket so that when the plunger rod assembly is in its inactive condition permitting relative movement between the piston assembly 86 and the coupler housing 80, the cam follower 104 will lie out of engagement with the high point of the cam 112.

The conduit 120 connects nipple 83 to the vacuum source 24 through timer control 30, conduit 122, remotely controlled valve 26 and conduit 124. In accordance with the broader aspects of this invention, either the timer control 30 or the remotely controlled valve 26, or both, may be omitted and other and different control means may be provided for controlling the source of vacuum. The wiper motor 14 has its coupler 23 connected to the source of vacuum through conduit 126, timer control 30, conduit 122, remote control valve 26, and conduit 124. It is apparent, of course, that other means are provided for independent, manual operation of the motor coupler 23, such as a Bowden cable, for example.

As shown in the drawings, the pump is incorporated in a unique windshield cleaning system which coordinates wiper-washer action to provide touch button operation for automatically and simultaneously initiating operation of the washer and wiper for a prescribed duration. The washer action terminates sooner than the wiper to provide a wet cycle for fluid delivery of lesser duration than the wiper cycle.

The touch button operated dashpot control or time delay mechanism 28 is provided for admitting atmospheric pressure to the remotely controlled valve 26 which is actuated thereby. It may be mounted in any suitable or convenient location for manual actuation by the operator of the motor vehicle, as for example, on the dash panel, as shown in FIG. 2. The dashpot control 28, FIG. 6, comprises a housing 130, a piston-type valve 132 axially movable therein, biased to its seated position by spring 134 disposed intermediate an end wall of the housing 130 and the center of the piston-type valve 132. On one end of the valve housing 130 there is a central opening 136 in which is disposed a manual plunger rod 138 which, when depressed, engages the piston valve 132 to unseat it. At the other end of the housing is an adjustable bleed 140. The piston 132 is so constructed that when it is advancing to its unseated position, air may escape between the periphery of the valve and the inner wall of the housing 130, but when it is returning to its seated position, the peripheral edge is sealed against the side walls of the housing 130. When the valve 132 is unseated, air may pass through the valve conduit 140 and the nipple 142 through a conduit 125 connected to remotely controlled valve 26. When the manual plunger rod 138 is released, the atmospheric bleed 140 permits the pressure on opposite sides of the valve 132 to equalize, thereby enabling the spring 134 to slowly move the valve 132 to its seated position after a suitable time delay. The atmospheric bleed 140 is adjustable.

The remotely controlled valve 26 is connected by nipple 152 to conduit 122 leading to the timer control 30 and by nipple 150 to the source of fluid pressure 24 through the conduit 124. Communication between nipple 150 and nipple 152 is controlled by a valve 154. A chamber 156 of remote controlled valve 26 is divided by a diaphragm piston 153 into a section 156a and a section 156b. Chamber 156 is exposed to the source of sub atmospheric pressure 24. A plunger 158 is actuated by movement of diaphragm piston 153. Thus when atmospheric pressure is admitted through conduit 125 and nipple 160 to chamber 156b, the diaphragm piston 153 moves upwardly causing the plunger 158 to unseat valve 154 thereby effecting communication between nipples 150 and 152 and closing atmospheric vent 159. The construction and operation of the valve 26 is described in greater detail in copending application Serial Number 240,791 filed November 29, 1962 by R. A. Deibel and W. C. Riester and assigned to the assignee of the present invention. Opening the valve 154 and remotely controlled valve 26 effects communication with timer control 30 through conduit 122 and nipple 162.

The timer control is illustrated in FIGS. 7 and 8. The timer control 30 comprises a body 161 having an inlet nipple 162 and a pair of outlet nipples 164 and 166 which enter chambers 168 and 170, respectively. Chambers 168 and 170 are separated by a valve 172. The valve 172 is biased into engagement with its seat by a caliper spring 176. A filtered atmospheric bleed 178 is adjustable by a plug 180 and a porous filter 182. The atmospheric bleed communicates with chamber 170. Nipples 162 and 164 effect uninterrupted communication between conduits 122 and 120 through chamber 168. When vacuum enters chamber 168 through nipple 162, differential pressure between chamber 170 and chamber 168 enables valve 172 to overcome the bias of caliper spring 176 thereby unseating it to admit vacuum into chamber 170 and out through nipple 166. When communication between chamber 176 and the vacuum source is interrupted by the seating of valve 154 in remotely controlled valve assembly 26, chamber 168 vents to the atmosphere through conduit 122 and vent 159 of remotely controlled valve 26. The pressure differential between chambers 168 and 170 is neutralized and reversed permitting spring 176 to cause valve 172 to reseat. Chamber 168 is connected to a vacuum source through conduit 122 and nipple 162 and to nipple 83 of the pump 32 as hereinabove described through nipple 164 and conduit 120. Chamber 170 is connected to the motor coupler 23 through nipple 166 and conduit 40.

The operation of timer 30 and remote control valve 26 in the system herein described results in the starting of the motor simultaneously with placing the pump in operative condition and permits the motor to continue operation for a period of time after the pump ceases to be operative. This operation is as follows. Operation of the dashpot control 28 connects the vacuum source 24 with chamber 168 of the timer control 30. Upon introduction of vacuum to chamber 168, valve 172 is instantaneously opened, thereby connecting both the coupler assembly 44 of the pump 32 and the motor coupler 23 of the wiper motor to the source of vacuum. Connecting the coupler assembly 44 of the pump 32 to a vacuum source effects engagement of cam follower 104 with cam surface 114 of cam 112. This places in operation both the pump and the wiper motor. When the dashpot control plunger 138 is released, atmospheric pressure entering through bleed 140 causes valve 132 to reseat itself with a time delay, thereby permitting the pump to operate for a time interval after release of plunger 138. When the valve 132 seats, remotely controlled valve 26 operates to interrupt communication of vacuum between the remote control valve and the timer control 30, resulting in interruption of vacuum to and venting of chamber 168 of timer control valve 30. This causes valve 172 to close. Atmospheric pressure then bleeds through filter 182 and bleed 178, chamber 170, nipple 166 and conduit 126 to motor coupler 23, causing operation of the wiper motor 14 to cease. By proper adjustment of plug 180 in timer control 30, the time that the wiper motor 14 will operate after seating of the valve 132 in dashopt control 28 can be regulated, but will always occur subsequent to discontinuance of the operation of the pump 32.

A modification of the invention is illustrated in FIGS. 10, 11 and 12 wherein the pump plunger assembly engages the wiper transmission through a cam mounted on the pivot shaft which carries the wiper arm. There is also shown in FIGS. 10, 11 and 12 a modified form of pump. It will, of course, be understood that the pump shown in FIGS. 1, 3 and 5 may be driven by the means shown in FIGS. 10, 11 and 12 and that the form of the pump shown in FIGS. 10, 11 and 12 may be driven by the means shown in FIGS. 1 through 9.

For purposes of brevity and clarity, only those elements of the modification illustrated in FIGS. 10, 11 and 12 which differ from corresponding elements in FIGS. 1 to 9 will be described in detail. Elements in FIGS. 10, 11 and 12 which are identical with corresponding elements in FIGS. 1 to 9 will be identified hereinafter by the same reference numerals.

Referring now to FIGS. 10, 11 and 12, there is shown a vehicle 10 which is provided with a windshield wiper motor 14, not visible, for driving wiper blade 16. As in the previous modification, the wiper blade 16 is driven through a transmission which includes a link 18, a lever 20 and a pivot shaft or rockshaft 21'. The pivot shaft 21' is journaled in a cylindrical bearing, not visible, which is housed in a bearing bracket 25' extending through a portion of the body of vehicle 10. The bearing bracket 25' may be formed integral with a combination bearing bracket and pump bracket mounting plate 27'. It may be tubular and extends outwardly from the mounting plate 27' on each side thereof. One end of the tubular bearing bracket 25' has external threads 31' thereon and this end extends through an opening in the vehicle body 10. It is covered by an escutcheon plate 33' and is clamped in place by a nut 35' which retains the escutcheon plate 33' and the mounting plate 27' in position clamping the body metal of vehicle body 10 therebetween. At the end of the pivot shaft or rockshaft 21' which extends outwardly of the outer surface of the vehicle body is secured a serrated arm driver 29' to which the arm mounting head 30' is rigidly secured. At its other end remote from the arm driver 29' which end extends inwardly of the inner surface of vehicle body there is a flattened or noncircular end extension 37' which projects out of the bearing bracket 25' and receives thereon the lever 20 which has a mating noncircular opening for engaging the flattened portion 37' of the shaft. Secured adjacent the outer end of the flattened end extension 37' on the shaft 21' is a cam assembly 39' which includes a tubular spacer 41' having a cam 112' which may be integrally secured on the end thereof. The cam 112' may be of suitable shape for the purpose of actuating a pump plunger. The cam assembly 39' includes a recess 43' in the face of the cam for insertion of a washer. After the cam is assembled on the noncircular end 37' of the shaft 21', the free end of the end portion 37' is deformed to retain the lever 20 and the cam assembly 39' thereon. The mounting plate 27' includes an extension 45' having a pair of threaded openings 47' thereon. The extension 45' is for the purpose of receiving a pump bracket 48'.

The bracket 48' includes a pair of openings 49' spaced for alignment with the openings 37' in the bearing plate 27'. The bracket 48' may be secured to the bearing plate 27' in any suitable manner as for example by employing bolts or screws 51' which extend through openings 49' and are threadably received in openings 47'. The bracket 48' has a flange 72' similar to the flange 72 of bracket 48, as shown in the FIG. 3 modification. Flange 72' includes a pair of ears 73' for securing cylinder 50 and cylinder bracket 62 thereto.

The cylinder 50 and cylinder bracket 62 are identical to corresponding cylinder 50 and cylinder bracket in the FIG. 3 modification. The bracket 62 is secured to ears 73' of flange 72' of bracket 48' and comprises a part of the pumping assembly 42' of the washer pump 32'. The plunger rod assembly 46' of this modification is identical to plunger rod assembly 46 shown in FIGS. 2 and 3. The enlarged portion 102' of the shaft 93' is received for axial movement in an anti-turn bearing mounted on bearing bracket 106' of the bracket 48' and carries a cam follower 104' in the form of a roller at its free end. The cam follower is disposed for engagement with surface 114' of cam 112' when the pump is in operative condition.

The pump 32' shown in FIGS. 10, 11 and 12 is of substantially the same construction and operates in substantially the same manner as corresponding pump 32 illustrated best in FIGS. 3 and 5, the primary difference being in the disposition of the return spring means for biasing the plunger assembly when coupled against the cam surface. In this modification the coupler housing 80' has integrally formed thereon, preferably at diametrically opposed areas on the side surface, a pair of hollow tubular spring housings 53' and 55' which are shaped to slidably receive ears 73' of flange 72' on bracket 48'. In each of these hollow tubular spring housings 53' and 55' is disposed a compression spring 56' between ears 69' and the base of the spring housings 53' and 55'. Also formed on the outer surface of the coupler housing 80' is a boss 79' which has an opening therethrough forming a conduit 81' which enters chamber 82 and which terminates in a nipple 83 through which vacuum is introduced to nipple 82 for initiating operation of the pump.

The operation of the embodiment shown in FIGS. 10, 11 and 12 is similar to that shown in FIGS. 1 through 9. When the wiper motor is placed in operation and vacuum is introduced through nipple 83', the plunger assembly 46 is extended and maintained extended to engage cam surface 114' of the cam 112' with cam follower 104'. The wiper motor oscillates rockshaft 21' through link 18 and lever 20. Oscillation of rockshaft 21' in turn moves cam 112' which is secured thereto and which operates to reciprocate plunger assembly 46' together with fluid displacement member 52 through engagement of cam follower 104' and cam surface 114'.

It should now be apparent that a unique windshield cleaning system has been provided in which wiper motor operation and washer pump operation can be coordinated. This system utilizes a novel pump which, as shown and described, is driven by an auxiliary cam associated with the wiper motor transmission linkage and which is driven by the wiper motor. When the pump is not operating, engagement between the wiper transmission linkage and the pump is completely severed, thereby reducing wear on both the wiper motor, its transmission linkage, and the pump. Further, due to the unique construction of the pump, no damage can be done to any part of the system by operation of the pump when solvent in the pump or in the lines is frozen or when any of the conduits are obstructed.

Although a certain specific control system utilizing timer means has been illustrated and described, it will be apparent that in accordance with the broader aspects of the invention, the pump may be utilized with other and different controls and may be driven from other moving parts of the wiper motor linkage. For example, the dashpot control 28 may be replaced by any suitable means for connecting and disconnecting the vacuum source; the remote control valve 26 may be omitted, and a manually actuated valve for opening and closing communication between the vacuum source and the pump may be utilized in its place. The timer control 30 may be omitted and other means for initiating motor operation may be utilized. The pump of this invention could be employed with a control system in which a separate valve is provided for effecting communication between a source of vacuum and the pump and another control may be utilized for initiating wiper motor operation.

Although certain specific embodiments of the invention have been described for the purpose of illustration, it will be apparent that various modifications and other embodiments are possible within the scope of the invention. It is to be understood, therefore, that the invention is not limited to the specific arrangement shown, but in its broadest aspects, it includes all equivalent embodiments and modifications which come within the scope of the invention.

What is claimed is:

1. In a windshield washer and wiper system comprising a wiper motor having an output element for driving a wiper transmission; a washer pump having a fluid displacing member and a plunger assembly, a coupling assembly comprising a pair of telescoping members, one of said telescoping members being rigid with said fluid displacing member, the other of said telescoping members being rigid with said plunger assembly, means for extending said telescoping members to effect engagement of said plunger assembly with a movable portion of said transmission linkage whereby said plunger assembly is driven by said movable portion of the transmission linkage.

2. In a windshield and wiper system comprising a wiper motor having an output means for driving a wiper; a washer pump having a fluid displacing member and a plunger assembly, coupling means telescopically coupling said plunger assembly and said fluid displacing member for relative axial movement, means yieldable in response to excessive pump resistance for extending said plunger assembly relative to said fluid displacing member to engage a movable portion of said output means and for maintaining said plunger extended.

3. In a windshield washer and wiper system comprising a wiper motor having output means for driving a wiper transmission and cam means on said output means for driving a washer pump; a washer pump having a fluid displacing member and a plunger assembly telescopically coupled for relative axial movement, cam follower means adjacent the free end of said plunger assembly for operative engagement with said cam means, means for extending said plunger assembly relative to said fluid displacing member to effect operative engagement between said cam follower means and said cam means and to maintain said plunger means in extended position, said extending means being yieldable in response to excessive pump resistance.

4. A windshield washer pump adapted to be driven by wiper motor output means, said pump comprising a fluid displacing member and shaft means for actuating said fluid displacing means, means comprising a housing and piston means for connecting said shaft and said fluid displacing member for axial movement relative to each other, means for effecting a fluid pressure differential on opposite sides of said piston to prevent axial movement between said shaft and said fluid displacing member.

5. A windshield washer pump adapted to be driven by wiper motor output means, said output means including cam means secured thereto for driving said pump, said pump including a plunger assembly and a fluid displacing member, said plunger including cam follower means disposed adjacent the free end thereof for engagement with said cam means, coupling means comprising a housing and piston means for connecting said cam follower means and said fluid displacing member for axial movement relative to each other, said piston being responsive to fluid pressure means acting thereon for maintaining said cam follower extended axially relative to said fluid displacing member for operative engagement with said cam means.

6. A windshield wiper and washer system comprising a motor having output means for driving a wiper, a pump, pump driving means on said output means for driving said pump, said pump including a fluid displacing member and a plunger assembly having means at one end for operative engagement with said pump driving means, means comprising a cylinder and piston means for extendably coupling said plunger assembly and said fluid displacing member, means acting on said piston means for maintaining said plunger assembly extended relative to said fluid displacement member for operative engagement with said driving means, means for interrupting said means acting on said piston to effect relative axial movement between said plunger assembly and said fluid displacing member and means for interrupting operation of said motor subsequent to interruption of said means acting on said piston.

References Cited in the file of this patent
FOREIGN PATENTS
860,087    Great Britain _____ Feb. 1, 1961